United States Patent
Sethuraman et al.

(10) Patent No.: US 11,388,135 B2
(45) Date of Patent: Jul. 12, 2022

(54) AUTOMATED MANAGEMENT SERVER DISCOVERY

(71) Applicant: EMC IP Holding Company LLC, Hopkinton, MA (US)

(72) Inventors: Manikandan Sethuraman, Bangalore (IN); Peniel Charles, Bangalore (IN); Nagaveni Bhavi, Bagalkot (IN); Amudha Krishnasamy, Salem (IN); Surendra Singh Chauhan, Ajmer (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/835,424

(22) Filed: Mar. 31, 2020

(65) Prior Publication Data
US 2021/0306295 A1 Sep. 30, 2021

(51) Int. Cl.
| | |
|---|---|
| G06F 13/00 | (2006.01) |
| H04L 61/4511 | (2022.01) |
| G06F 9/54 | (2006.01) |
| G06F 16/182 | (2019.01) |
| G06F 16/11 | (2019.01) |
| G06F 16/14 | (2019.01) |

(Continued)

(52) U.S. Cl.
CPC ......... H04L 61/1511 (2013.01); G06F 8/60 (2013.01); G06F 9/54 (2013.01); G06F 16/122 (2019.01); G06F 16/156 (2019.01); G06F 16/182 (2019.01); G06F 21/105 (2013.01); H04L 61/1541 (2013.01)

(58) Field of Classification Search
CPC ........... H04L 61/1511; H04L 61/1541; G06F 21/105; G06F 8/60; G06F 16/122; G06F 16/182; G06F 9/54; G06F 16/156; G06F 21/121

USPC ................. 709/223, 203, 230, 225, 229
See application file for complete search history.

(56) References Cited

U.S. PATENT DOCUMENTS

| | | | | |
|---|---|---|---|---|
| 7,571,437 B2 * | 8/2009 | Tanno | ....................... | G06F 8/60 709/220 |
| 7,818,741 B1 * | 10/2010 | Bourdev | ............... | G06F 21/105 717/174 |

(Continued)

OTHER PUBLICATIONS

DELL EMC, "DELL EMC SC Series Storage and Microsoft Multipath I/O," CML 1004, Jul. 2018, 36 pages.

(Continued)

*Primary Examiner* — Kenneth R Coulter
(74) *Attorney, Agent, or Firm* — Ryan, Mason & Lewis, LLP (57) ABSTRACT

A host device comprises a processor coupled to a memory. Upon installation or update of a software program configured to execute on the host device and wherein a management operation is to be performed for the software program in conjunction with a management server, the host device is configured to send a query to a given system with which the host device interacts with respect to one or more operations different than the management operation. The host device is further configured to obtain from the given system, in response to the query, a reply with management server information previously stored on the given system, and then utilize the management server information obtained from the given system to communicate with the management server to perform the management operation.

20 Claims, 5 Drawing Sheets

(51) Int. Cl.
*H04L 61/4541* (2022.01)
*G06F 8/60* (2018.01)
*G06F 21/10* (2013.01)

(56) References Cited

U.S. PATENT DOCUMENTS

| | | | |
|---|---|---|---|
| 11,169,941 B2* | 11/2021 | Rao | G06F 13/4221 |
| 2004/0117767 A1* | 6/2004 | Tanno | G06F 8/60 |
| | | | 717/124 |
| 2007/0078984 A1* | 4/2007 | Abei | G06F 21/105 |
| | | | 709/226 |
| 2011/0162062 A1* | 6/2011 | Kumar | H04L 63/0272 |
| | | | 726/15 |

OTHER PUBLICATIONS

Wikipedia, "Software License," https://en.wikipedia.org/w/index.php?title=Software_license&oldid=947460001, Mar. 26, 2020, 8 pages.

* cited by examiner

ABSTRACT

AUTOMATED MANAGEMENT SERVER DISCOVERY

FIELD

The field relates generally to information processing systems, and more particularly to automated management server discovery techniques in such an information processing system.

BACKGROUND

Information processing systems such as, for example, data centers typically utilize one or more third party (vendor) software programs to perform their intended operations. In so doing, one or more management operations may have to be performed in accordance with a given software program. For example, an enterprise that runs a data center typically licenses the software from the vendor. A license is a legal agreement between the vendor and the enterprise whereby, in exchange for purchase and receipt of the software from the vendor, the enterprise agrees to terms for use and distribution of the software. The terms of each license agreement depend on the nature of the functionality of the software.

Thus, after the licensing operation is completed between the enterprise and the vendor, which may be different for each vendor and/or product, the software is considered licensed and becomes fully functional. By fully functional, it is understood that a software program, before being licensed, typically has a minimal functionality to at least allow the program to be loaded on a device and start a registration process which may include a licensing initiation operation. Once the program is licensed, the program then typically has all of the functions (fully functional) enabled that it was intended to provide to the enterprise (e.g., normal operations such as, but not limited to, document creation for word processing programs, virus protection for antivirus programs, input/output management for data center path selection programs, etc.).

Management of such software licenses can be a challenge especially when a given vendor software package is in widespread use across many host devices of a given information processing system.

SUMMARY

Illustrative embodiments provide automated techniques to enable host devices in an information processing system to discover a management server configured to manage one or more operations associated with the host devices. While illustrative embodiments are well-suited for a licensing operation associated with a software program, it is to be appreciated that the management server discovery techniques described herein can apply to any operation associated with a software program or other product.

For example, in one embodiment, an apparatus comprises a host device comprising a processor coupled to a memory. Upon installation or update of a software program configured to execute on the host device and wherein a management operation is to be performed for the software program in conjunction with a management server, the host device is configured to send a query to a given system with which the host device interacts with respect to one or more operations different than the management operation. The host device is further configured to obtain from the given system, in response to the query, a reply with management server information previously stored on the given system, and then utilize the management server information obtained from the given system to communicate with the management server to perform the management operation.

In one illustrative embodiment, the given system comprises a storage system (e.g., comprising one or more storage arrays) operatively coupled to the host device, and further wherein the storage system is configured to store data associated with execution of the software program. This embodiment may be referred to herein, in a non-limiting manner, as an "in-band" embodiment.

In another illustrative embodiment, the given system comprises a domain name system operatively coupled to the host device. This embodiment may be referred to herein, in a non-limiting manner, as an "out-of-band" embodiment.

Advantageously, in further illustrative embodiments, when the management operation is a licensing operation to enable one or more functionalities in a software program individually executable on multiple host devices in a data center, discovery of each host device with the software program installed need not be performed by the management server. Rather, once the management server information is stored on the given system (e.g., a storage system or a domain name system), host devices obtain the management server information from the storage system (in-band discovery and licensing) or the domain name system (out-of-band discovery and licensing), and can then request license checkout from the management server.

Thus, in an illustrative in-band embodiment, once at least one host device becomes licensed in the data center, the management server information (e.g., Internet Protocol address, etc.) is sent by that host device to the storage system and stored. Then, when the software program is subsequently installed on other host devices in the data center, those host devices can each obtain the management server information from the storage system.

In an illustrative out-of-band embodiment, the domain name system is updated with the management server information enabling each host device, upon having the software program installed, to send a service discovery request to the domain name system to obtain the management server information.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

By way of one example, an information processing system may use a multipathing software program to manage input/output (TO) operations between host servers and storage arrays that are part of a data center. One example of such a multipathing software program is PowerPath® from Dell EMC of Hopkinton, Mass. A multipathing software program such as PowerPath® could have hundreds of thousands or more of server installations across thousands of customer sites wherein the main licensing scheme is a classic licensing model, e.g., static license keys which can be used on any number of servers (i.e., host devices). As illustratively used herein, a license key is a data string that verifies authorized software product access to protect vendor software from unauthorized copying or sharing by unlicensed users. A static license key is typically a data string that is obtained by the enterprise from the vendor contemporaneous with purchase of the software program. For example, the data string may be printed or otherwise available in documentation provided with a newly purchased software package that the enterprise provides to the vendor during product registration, e.g., by entering the data string on a product registration webpage of the vendor.

For an enterprise to move away from static license keys to an electronic licensing approach, whereby product licenses are dispatched and verified electronically using the servers themselves, certain components and configurations are required to be installed on the servers. In the case of PowerPath®, each server or host device would typically require to have installed thereon an OpenSSL, or some other secure communication protocol, and a license component that can communicate with a centralized licensing server over the secure communication protocol. However, even with these components installed, all host devices need to be discovered from the centralized licensing server for a license to be dispatched, which is not an ideal solution. Moreover, if there are any Internet Protocol (IP) address changes in the data center, any affected host device which was already discovered in the centralized licensing server requires manual rediscovery and configuration operations in order to keep their license active, which would be a tedious task for data center administrators. Further, in a case where the centralized licensing server itself needs to be redeployed, all manual discovery procedures for the host devices managed by that license server would have to be repeated.

Illustrative embodiments overcome the above and other drawbacks associated with electronic licensing approaches by providing an automated management operation model which enables a software program executing on a host device to automatically obtain an electronic license from a licensing server using a dynamic discovery methodology. Advantageously, with dynamic discovery of a licensing server, an enterprise need not perform discovery of each software-installed host device in a data center. An automated licensing model according to illustrative embodiments can be achieved either via in-band communication or an out-of-band communication as needed and/or desired by the enterprise. As illustratively used herein, "in-band communication" refers to communication of both management server information (e.g., licensing server discovery data) and normal host operational data over the same communication channel or network, while "out-of-band communication" refers to communication of the management server information and the normal host operational data over separate communication channels or networks. In-band and out-of-band discovery and management operation embodiments will now be illustratively explained.

Figure 1:
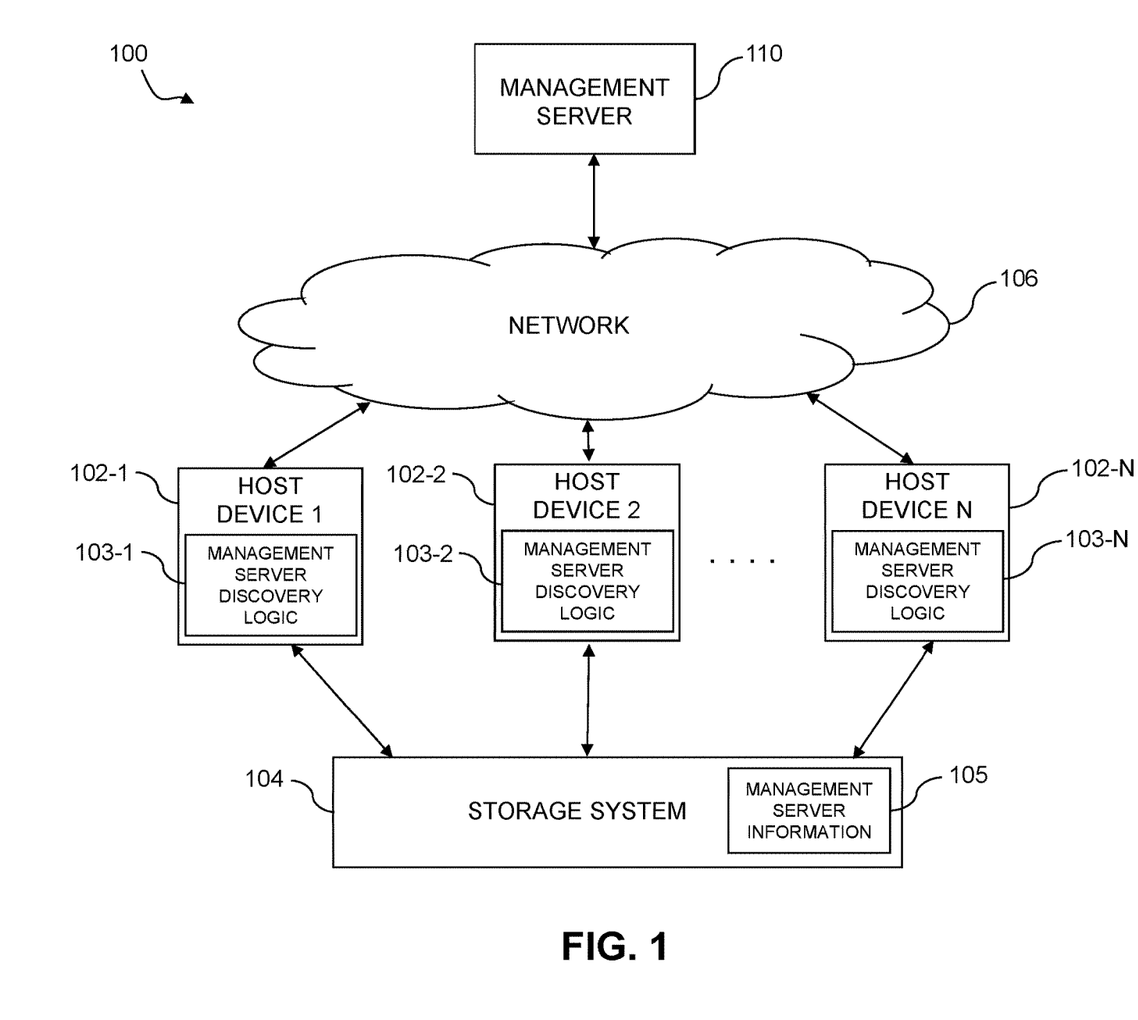
FIG. 1 depicts an information processing system with in-band discovery of a management server according to an illustrative embodiment.

FIG. 1 depicts an information processing system 100 configured with in-band discovery of a management server according to an illustrative embodiment. As shown, the information processing system 100 comprises a plurality of host devices 102-1, 102-2, . . . 102-N collectively referred to herein as host devices 102. The host devices 102 communicate with a storage system 104 via a network (not expressly shown but that is described further below in the context of an illustrative embodiment in FIG. 2). For example, in some embodiments, the storage system 104 may comprise one or more storage arrays coupled to the host devices 102 via, or as part of, at least one storage area network (SAN). As further shown, the host devices 102 are also coupled through a network 106 to a management server 110. Management server 110 is configured to provide the management operation support that the host devices 102 need to perform a specific management operation, e.g., licensing operations, as will be further explained below.

Network 106 may be implemented as a portion of a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks. The network 106 in some embodiments therefore comprises combinations of multiple different types of networks each comprising processing devices configured to communicate using IP and/or other types of communication protocols.

As further shown, the host devices 102 respectively comprise management server discovery logic 103-1, 103-2, . . . 103-N individually referred to as management server discovery logic 103. As will be further illustratively described below in the context of FIG. 2, upon installation or update of a software program configured to execute on one of the host devices 102, the management server discovery logic 103 of the given host device 102 sends a query to storage system 104. As shown, storage system 104 includes management server information 105 previously stored thereon (examples of how the management server information 105 is previously stored on storage system 104 will be further explained below). In response to the query from the management server discovery logic 103 of the given host device 102, the storage system 104 sends a reply with the management server information 105 to the management server discovery logic 103 of the given host device 102.

The management server discovery logic 103 of the given host device 102 utilizes the management server information 105 obtained from the storage system 104 to contact the management server 110 via network 106 to perform a management operation, e.g., a licensing operation to enable one or more functionalities in the software program installed or updated on the given host device 102. For example, in some embodiments, the management server information 105 may comprise an IP address, a hostname, or some other suitable information for communicating with the management server 110.

In some embodiments, the management server information 105 is provided to the storage system 104 by a first one of the host devices 102 performing the management operation with the management server 110. The first one of the host devices 102 may obtain the management server information 105, e.g., through a data center administrator or some other initial bootstrapping mechanism. Thus, once the management server information 105 is stored on the storage system 104, subsequent ones of the host devices 102 (i.e., their corresponding management server discovery logic 103) each respectively send a request and obtain the management server information from the storage system 104 and can then contact the management server 110 and perform the management operation.

Note that information processing system 100 illustrates an in-band (i.e., communication of both management server information and normal host operational data over the same communication channel or network) discovery of management server 110 since storage system 104 is a given system with which the host devices 102 typically interact with respect to one or more operations different than the management operation, e.g., in this case, during execution of the software program associated with normal host operations. An example of normal host operations includes running one or more applications and issuing IO commands to read and/or write data from/to the storage system 104 in accordance with execution of a given one of the applications. This will be further explained and evident in the illustrative embodiment described below in the context of FIG. 2.

Figure 2:
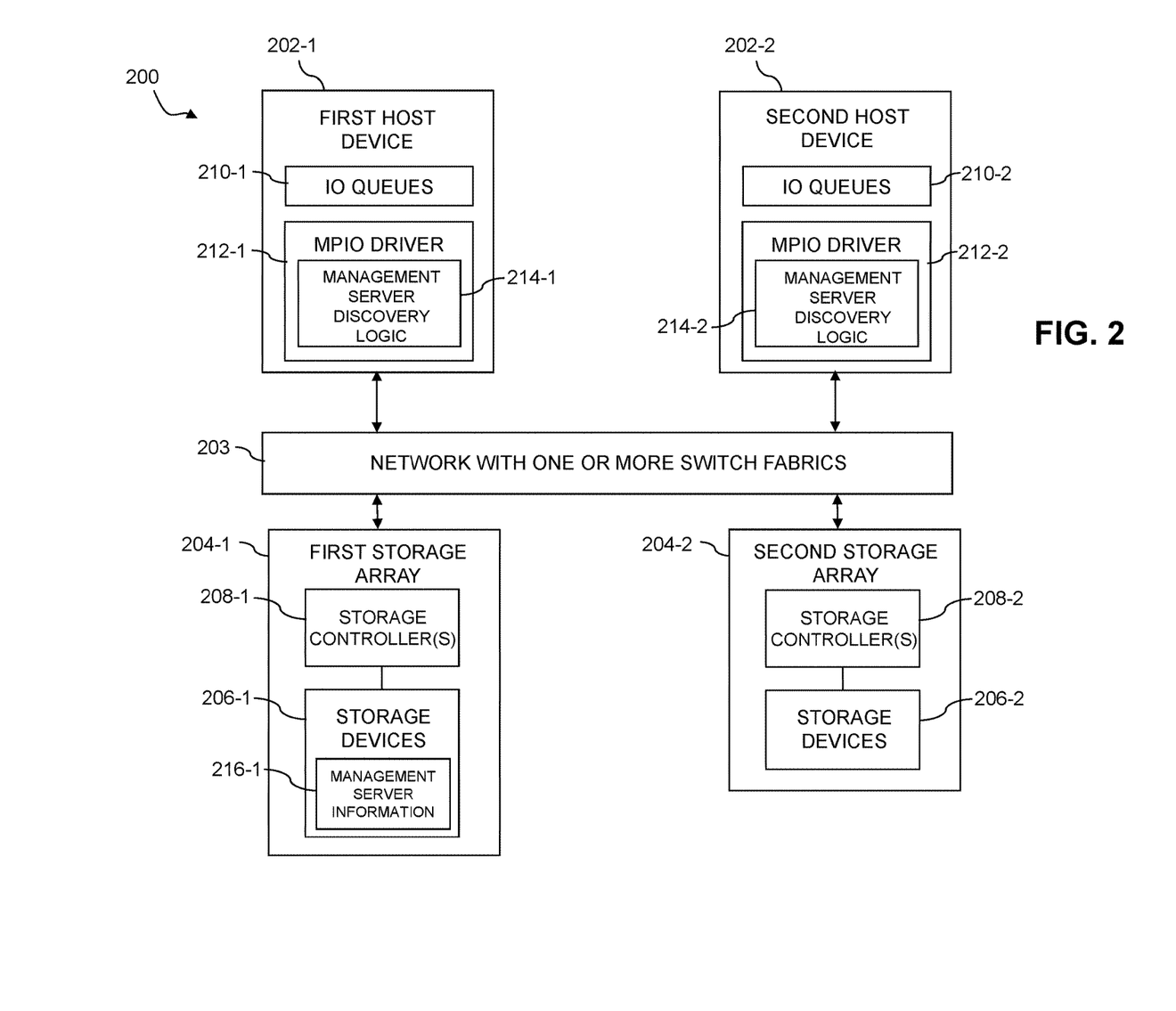
FIG. 2 depicts further details of an information processing system with in-band discovery of a management server according to an illustrative embodiment.

Turning now to FIG. 2, details of an information processing system 200 with in-band discovery of a management server according to an illustrative embodiment are depicted. It is to be appreciated that information processing system 200 can be considered a more detailed example of the part of information processing system 100 comprising the host devices 102 operatively coupled to storage system 104. Thus, while not expressly shown in FIG. 2, it is understood that management server 110 is coupled to the host devices shown in FIG. 2 through network 106.

The information processing system 200 comprises at least first and second host devices 202-1 and 202-2, collectively referred to herein as host devices 202. The host devices 202 are coupled to a network 203 that comprises one or more switch fabrics. The host devices 202 communicate over the network 203 via the one or more switch fabrics with at least first and second storage arrays 204-1 and 204-2, collectively referred to herein as storage arrays 204. For example, the network 203 illustratively comprises at least one storage area network (SAN) and the one or more switch fabrics illustratively comprise respective distinct switch fabrics of a set of multiple switch fabrics interconnecting the host devices 202 with the storage arrays 204 over the one or more SANs. Each of the one or more switch fabrics in some embodiments is associated with a different SAN.

The system 200 may be configured such that the first host device 202-1 communicates with the first storage array 204-1 over a first switch fabric and communicates with the second storage array 204-2 over a second switch fabric. Similarly, the second host device 202-2 can communicate with the first storage array 204-1 over the first switch fabric and communicate with the second storage array 204-2 over the second switch fabric. Numerous other interconnection arrangements are possible.

Also, other types of networks can be used in other embodiments, and references to SANs, switch fabrics or other particular network arrangements herein are for purposes of illustration only, as non-limiting examples.

Although only two host devices 202 and two storage arrays 204 are shown in the figure, this is by way of illustrative example only, and other embodiments can include additional instances of such elements. It is also possible that alternative embodiments may include only a single host device.

The host devices 202 illustratively comprise respective computers, servers or other types of processing devices configured to communicate with the storage arrays 204 over the network 203. For example, at least a subset of the host devices 202 may be implemented as respective virtual machines of a compute services platform or other type of processing platform. The host devices 202 in such an arrangement illustratively provide compute services such as execution of one or more applications on behalf of each of one or more users associated with respective ones of the host devices 202. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 203 may be implemented using multiple networks of different types to interconnect the various components of the information processing system 200. For example, the network 203 may comprise a portion of a global computer network such as the Internet, although other types of networks can be part of the network 203, including a wide area network (WAN), a local area network (LAN), a satellite network, a telephone or cable network, a cellular network, a wireless network such as a WiFi or WiMAX network, or various portions or combinations of these and other types of networks. The network 203 in some embodiments therefore comprises combinations of multiple different types of networks each comprising processing devices configured to communicate using IP and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 203 in the figure, at least portions of the storage arrays 204 may be considered part of the network 203 in some embodiments. For example, in embodiments in which the network 203 comprises at least one SAN, the storage arrays 204 may be viewed as part of the one or more SANs.

The storage arrays 204-1 and 204-2 comprise respective sets of storage devices 206-1 and 206-2, collectively referred to herein as storage devices 206, coupled to respective storage controllers 208-1 and 208-2, collectively referred to herein as storage controllers 208.

The storage devices 206 of the storage arrays 204 illustratively comprise solid state drives (SSDs). Such SSDs in some embodiments are implemented using non-volatile memory (NVM) devices such as flash memory. Other types of NVM devices that can be used to implement at least a portion of the storage devices 206 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices.

In some embodiments, at least one of the storage arrays 204 illustratively comprises one or more VNX®, VMAX®, Unity™ or PowerMax™ storage arrays, as well as other commercially available storage arrays from Dell EMC of Hopkinton, Mass.

As another example, one or both of the storage arrays 204 may comprise respective clustered storage systems, each including a plurality of storage nodes interconnected by one or more networks. An example of a clustered storage system of this type is an XtremIO™ storage array from Dell EMC, illustratively implemented in the form of a scale-out all-flash content addressable storage array.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices 202 and the storage arrays 204 within the system 200 may utilize PCIe connections or other types of connections implemented over one or more networks such as network 203. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 204 in some embodiments may be implemented as part of cloud infrastructure in the form of a cloud-based system such as an Amazon Web Services (AWS) system. Other examples of cloud-based systems that can be used to provide at least portions of the storage arrays 204 and possibly other portions of system 200 include Google Cloud Platform (GCP) and Microsoft Azure.

As is apparent from the foregoing, terms such as "storage array" and "storage system" as used herein are intended to be broadly construed, and a given such storage array or storage system may encompass, for example, multiple distinct instances of a commercially-available storage array.

The storage devices 206 of the storage arrays 204 are configured to store data utilized by one or more applications running on one or more of the host devices 202. The storage devices 206 on one of the storage arrays 204 are illustratively arranged in one or more storage pools. The storage arrays 204 and their corresponding storage devices 206 are examples of what are more generally referred to herein as "storage systems." A given such storage system in the present embodiment may be shared by the host devices 202, and in such arrangements may be referred to as a "shared storage system."

The storage devices 206 of the storage arrays 204 implement logical units (LUNs) configured to store objects for users associated with the host devices 202. These objects can comprise files, blocks or other types of objects. The host devices 202 interact with the storage arrays 204 utilizing read and write commands as well as other types of commands that are transmitted over the network 203.

Such commands in some embodiments more particularly comprise SCSI commands, although other types of commands may be used in other embodiments, including commands that are part of a standard command set, or custom commands such as a "vendor unique command" or VU command that is not part of a standard command set.

A given IO operation as that term is broadly used herein illustratively comprises one or more such commands. References herein to terms such as "input-output" and "IO" should be understood to refer to input and/or output. Thus, an IO operation relates to at least one of input and output. For example, an IO operation can comprise at least one read IO operation and/or at least one write IO operation. More particularly, IO operations may comprise write requests and/or read requests directed to stored data of a given one of the storage arrays 204.

Each IO operation is assumed to comprise one or more commands for instructing at least one of the storage arrays 204 to perform particular types of storage-related functions such as reading data from or writing data to particular logical storage volumes or other logical storage devices of one or more of the storage arrays 204. Such commands are assumed to have various payload sizes associated therewith, and the payload associated with a given command is referred to herein as its "command payload."

A command directed by the host device 202-1 to one of the storage arrays 204 is considered an "outstanding" command until such time as its execution is completed in the viewpoint of the host device 202-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Also, the term "storage device" as broadly used herein can encompass, for example, a logical storage device such as a LUN or other logical storage volume. A logical storage device can be defined in the storage arrays 204 to include different portions of one or more physical storage devices. The storage devices 206 may therefore be viewed as comprising respective LUNs or other logical storage volumes. Logical storage devices are also referred to herein as simply "logical devices."

Each of the host devices 202 illustratively has multiple paths to each of the storage arrays 204 via the network 203, with at least one of the storage devices 206 of one of the storage arrays 204 being visible to that host device on a given one of the paths, although numerous other arrangements are possible. A given one of the storage devices 206 may be accessible to a given host device over multiple paths. Different ones of the host devices 202 can have different numbers and types of paths to the storage arrays 204.

Different ones of the storage devices 206 of the storage arrays 204 illustratively exhibit different latencies in processing of IO operations. In some cases, the same storage device may exhibit different latencies for different ones of multiple paths over which that storage device can be accessed from a given one of the host devices 202.

The host devices 202, network 203 and storage arrays 204 in the FIG. 2 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

Additional examples of processing platforms utilized to implement storage systems and possibly one or more associated host devices in illustrative embodiments will be described in more detail below.

The host devices 202 and the storage arrays 204 may be implemented on respective distinct processing platforms, although numerous other arrangements are possible. For example, in some embodiments at least portions of the host devices 202 and the storage arrays 204 are implemented on the same processing platform. The storage arrays 204 can therefore be implemented at least in part within at least one processing platform that implements at least a subset of the host devices 202.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 202 are possible, in which certain ones of the host devices 202 reside in one data center in a first geographic location while other ones of the host devices 202 reside in one or more other data centers in one or more other geographic locations that are potentially remote from the first geographic location. Thus, it is possible in some implementations of the system 200 for different ones of the host devices 202 to reside in different data centers than the storage arrays 204. The storage arrays 204 can be similarly distributed across multiple data centers.

Although in some embodiments certain commands used by the host devices 202 to communicate with the storage arrays 204 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP. Combinations of two or more command protocols may also be implemented.

A given storage volume stored in storage arrays 204 in the system 200 illustratively comprises a set of one or more LUNs or other storage volumes of the storage arrays 204. Each such LUN or other storage volume is assumed to comprise at least a portion of a physical storage space of one or more of the storage devices 206 of the corresponding storage arrays 204.

The host devices 202 comprise respective sets of IO queues 210-1 and 210-2 collectively referred to as IO queues 210, and respective MPIO drivers 212-1 and 212-2 collectively referred to as MPIO drivers 212. The MPIO drivers 212 collectively comprise a multi-path layer of the host devices 202. The multi-path layer provides automated path selection functionality within the MPIO drivers 212.

The MPIO drivers 212 may comprise, for example, PowerPath® drivers from Dell EMC, suitably modified in the manner disclosed herein to support management server discovery functionality. Other types of MPIO drivers from other driver vendors may be suitably modified to incorporate functionality for management server discovery as disclosed herein. A given MPIO driver 212 is considered an example of a software program installed on a host device for which a management operation (e.g., licensing operation) is to be performed to enable the full functionality of the MPIO driver 212.

During multipathing operations (i.e., normal operational functions of the MPIO driver software), the MPIO driver 212-1 is further configured to select IO operations from its corresponding set of IO queues 210-1 for delivery to the storage arrays 204 over the network 203. The sources of the IO operations stored in the set of IO queues 210-1 illustratively include respective processes of one or more applications executing on the host device 202-1. Other types of sources of IO operations may be present in a given implementation of system 200.

The paths over which the IO operations are sent from the host device 202-1 to the storage arrays 204 illustratively comprise paths associated with respective initiator-target pairs, with each initiator comprising a host bus adaptor (HBA) or other initiating entity of the host device 202-1 and each target comprising a storage array port or other targeted entity corresponding to one or more of the storage devices 206 of the storage arrays 204. As noted above, the storage devices 206 of the storage arrays 204 illustratively comprise LUNs or other types of logical storage devices.

For example, in selecting particular ones of the paths for delivery of the IO operations to the storage arrays 204, the MPIO driver 212-1 illustratively implements a path selection algorithm that selects particular ones of the paths at least in part as a function of path information such as host device HBA and storage array port, with the path selection algorithm being configured to balance the IO operations over the paths or to achieve other load balancing or performance goals.

Selecting a particular one of multiple available paths for delivery of a selected one of the IO operations of the set of IO queues 210-1 is more generally referred to herein as "path selection." Path selection as that term is broadly used herein can in some cases involve both selection of a particular IO operation and selection of one of multiple possible paths for accessing a corresponding logical device of one of the storage arrays 204. The corresponding logical device illustratively comprises a LUN or other logical storage volume to which the particular IO operation is directed.

A given retry of a failed IO operation under such a path selection algorithm can select a path having a different host device HBA and storage array port for a given retry than that of the path selected for the original failed IO operation.

The paths between the host devices 202 and the storage arrays 204 can change over time. For example, the addition of one or more new paths from host device 202-1 to the storage arrays 204 or the deletion of one or more existing paths from the host device 202-1 to the storage arrays 204 may result from respective addition or deletion of at least a portion of the storage devices 206 of the storage arrays 204. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays.

In these and other situations, path discovery scans may be repeated as needed in order to discover the addition of new paths or the deletion of existing paths.

A given path scan can be performed utilizing known functionality of MPIO drivers, such as PowerPath® drivers. These and other references to PowerPath® herein are presented by way of illustrative example only, and should not be construed as limiting in any way.

The path scan in some embodiments may be further configured to identify one or more new LUNs or other logical storage volumes associated with the one or more new paths identified in the path discovery scan. The path scan may comprise, for example, one or more bus scans which are configured to discover the appearance of any new LUNs that have been added to the storage arrays 204 as well to discover the disappearance of any existing LUNs that have been deleted from the storage arrays 204. For each of one or more new paths identified in the path discovery scan, the host device 202-1 may be configured to execute a host registration operation for that path. The host registration operation for a given new path illustratively provides notification to the corresponding one of the storage arrays 204 that the host device 202-1 has discovered the new path.

As is apparent from the foregoing, MPIO driver 212-1 of host device 202-1 is configured to control delivery of IO operations from the host device 202-1 to the first and second storage arrays 204 over selected paths through the network 104.

It is assumed that the other MPIO driver 212-2 is configured in a manner similar to that described above and elsewhere herein for the first MPIO driver 212-1. The MPIO driver 212-2 is therefore similarly configured to select IO operations from its corresponding one of the sets of IO queues 210 for delivery to the storage arrays 204 over the network 203 and to perform at least portions of the disclosed functionality. Accordingly, aspects of functionality described above in the context of the first MPIO driver 212-1 and the first host device 202-1 are assumed to be similarly performed by the other MPIO driver 212-2 and the other host device 202-2.

The MPIO drivers 212 may be otherwise configured utilizing well-known MPIO functionality such as that described in "Dell EMC SC Series Storage and Microsoft Multipath I/O," Dell EMC, CML1004, July 2018, which is incorporated by reference herein. Such conventional MPIO functionality is suitably modified in illustrative embodiments disclosed herein to support management server discovery functionality as will be further described below.

Furthermore, in accordance with illustrative embodiments and as mentioned above, each MPIO driver 212 is one example of a software program configured to execute on the host device 202 and wherein a management operation, e.g., licensing operation, is to be performed for the software program in conjunction with a management server (e.g., 110 in FIG. 1 but not expressly shown in FIG. 2 for sake of simplifying the illustration). That is, upon installation or update on a host device 202, each MPIO driver 212 performs a licensing operation with a centralized licensing server (management server) to enable a full set of MPIO functionalities.

Assume that host device 202-1 is the first host device in information system 200 upon which MPIO driver 212-1 is installed. MPIO driver 212-1 performs a licensing operation with a centralized licensing server (management server 110). As such, during the licensing operation, MPIO driver 212-1 becomes aware of the licensing server location address and, using SCSI IO operations described above and further below, writes the licensing server location address to storage array 204-1 where it is stored on one of the storage devices, e.g., storage device 206-1, as management server information 216-1.

Accordingly, when MPIO driver 212-2 is subsequently installed on host device 202-2, MPIO driver 212-2 automatically sends a SCSI IO command to storage array 204-1 to obtain the licensing server location address stored on storage devices 206-1 as management server information 216-1. MPIO driver 212-2 extracts the licensing server location address from the reply sent from storage array 204-1 and uses the licensing server location address to contact the licensing server (management server 110) and perform the licensing operation.

It is to be appreciated that while FIG. 2 shows the licensing server location address stored on storage devices 206-1 as management server information 216-1, alternatively, the licensing server location address can be stored on storage devices 206-2 as management server information. Further, in additional alternative embodiments, licensing server location address can be stored on both storage devices 206-1 as management server information. Also, while management server discovery logic 214 is shown as being part of the MPIO driver 212, in alternative embodiments, parts of or the entire management server discovery logic 214 can reside on the host device 202 separate from the MPIO driver 212. Thus, while steps are illustratively described herein as being initiated or otherwise performed by the software program (e.g., MPIO diver 212), it is to be understood that steps can more generally be considered as being initiated or otherwise performed by the host device upon which the software program resides.

As explained above, because MPIO driver 212 uses the same communication protocol (e.g., SCSI IO commands) to obtain the licensing server location address that it does to perform normal multipathing operations associated with application read/write operations, the FIG. 2 embodiment is considered an in-band discovery embodiment. One further illustrative embodiment of in-band discovery of the management server and licensing will be explained below in the context of FIG. 3.

It is to be appreciated that the above-described features of system 200 and other features of other illustrative embodiments are presented by way of example only, and should not be construed as limiting in any way. Accordingly, different numbers, types and arrangements of system components such as host devices 202, network 203, storage arrays 204, storage devices 206, sets of IO queues 210, and MPIO drivers 212 can be used in other embodiments.

It should also be understood that the particular sets of modules and other components implemented in the system 200 as illustrated in FIG. 2 are presented by way of example only. In other embodiments, only subsets of these components, or additional or alternative sets of components, may be used, and such components may exhibit alternative functionality and configurations.

Particular processing operations and other system functionality described herein are presented by way of illustrative example only, and should not be construed as limiting the scope of the disclosure in any way. Alternative embodiments can use other types of processing operations involving host devices, storage systems and management server discovery functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different arrangements within a given information processing system.

Functionality can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
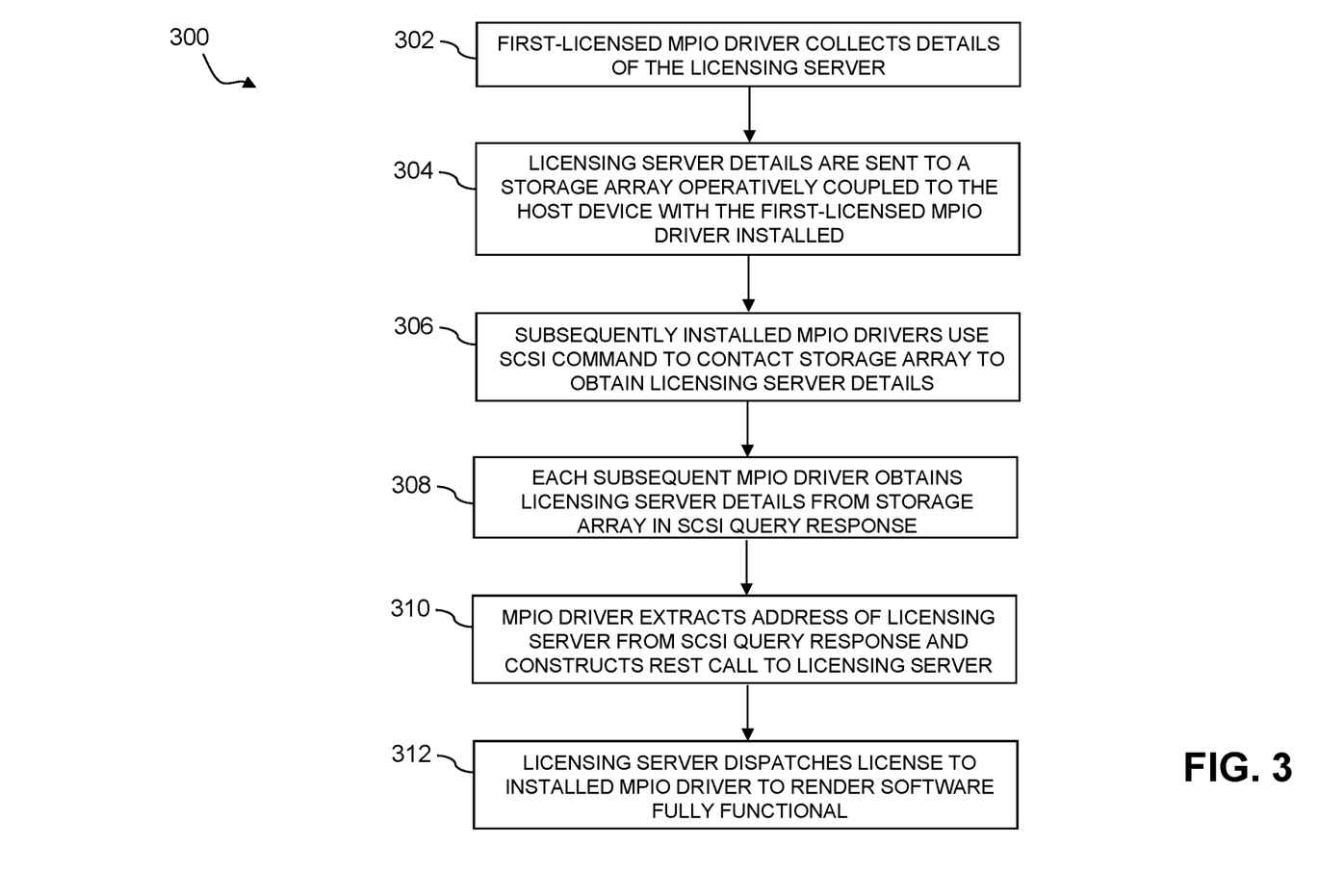
FIG. 3 depicts a methodology for in-band discovery of a management server according to an illustrative embodiment.

Referring now to FIG. 3, a methodology 300 is depicted for in-band discovery of a licensing server (as an example of management server 110) according to an illustrative embodiment.

In some in-band discovery and licensing embodiments, specific unique SCSI commands are used to publish and discover the software product's licensing server details over in-band communication (e.g., over the SAN fabric). Advantageously, there are no multicasts or broadcasts required. It is to be understood that while the FIG. 3 embodiment refers to an MPIO driver (212), in the context of a host device (202) and a storage array (204) as described in the FIG. 2 embodiment, as the example software package for which licensing management is being provided, alternative embodiments with any suitable software program or product are contemplated.

An illustrative in-band discovery workflow is depicted in methodology 300 as follows:

Step 302: Once any one of the MPIO drivers (installed on a host device) is licensed electronically via the licensing server (management server 110), the first-licensed MPIO driver collects details of the licensing server (management server information 216). Note that while methodology 300 refers to the first-licensed MPIO driver, in alternative embodiments, a subsequently-licensed MPIO driver could initiate the workflow of methodology 300.

Step 304: The licensing server details (e.g., IP address of licensing server) are sent to a storage array operatively coupled to the host device with the first-licensed MPIO driver installed. In some embodiments, the licensing server details can be sent from the host device to the storage array via one or more vendor-unique SCSI commands (e.g., log select/host registration). Accordingly, the storage array is now aware of the licensing server details.

Step 306: MPIO drivers subsequently installed on other host devices use the log sense SCSI command to contact the storage array to obtain the licensing server details.

Step 308: In response to the command being sent to the storage array, the MPIO driver on each host obtains the licensing server details from the storage array in a SCSI log sense query response.

Step 310: The MPIO driver extracts the address of the licensing server from the SCSI log sense query response, and constructs a Representational State Transfer (REST) call with its host's universally unique identifier (UUID) to the licensing server, requesting a license checkout.

Step 312: The licensing server, in response, dispatches a license (management object) to the installed MPIO driver and the software becomes fully functional.

Some advantages of the in-band methodology include but are not limited to:

1. With this implementation, as soon as one host-installed software program becomes licensed via the licensing server, the information is shared with the storage array and all other hosts which interact with the same storage array can automatically get connected to the licensing server and have their respective copies of the software program electronically licensed.
2. No external discovery services/configuration is required in the in-band embodiment.
3. Licensing server discovery does not involve any multicasts/broadcasts.
4. Even if the licensing server IP or hostname is changed, as soon as one host performs a license request, the storage array is updated with the new licensing server details and other hosts quickly get connected to the new licensing server for license refresh.
5. A similar approach can be used for any products which involves a management operation such as electronic licensing from remote servers.
6. Also, the proposed idea can be used for any existing centralized monitoring software, which involves manual discovery.

In the above workflow explanation, an example of PowerPath® software (MPIO driver) obtaining a software license from the licensing server is described. Thus, in this scenario, both the software product which needs to be electronically licensed and the software entity which sends SCSI commands for updating a storage array with licensing server details are the same software. However, as mentioned, any software product can automatically discover a licensing server for license discovery using the illustrative embodiments described herein.

Figure 4:
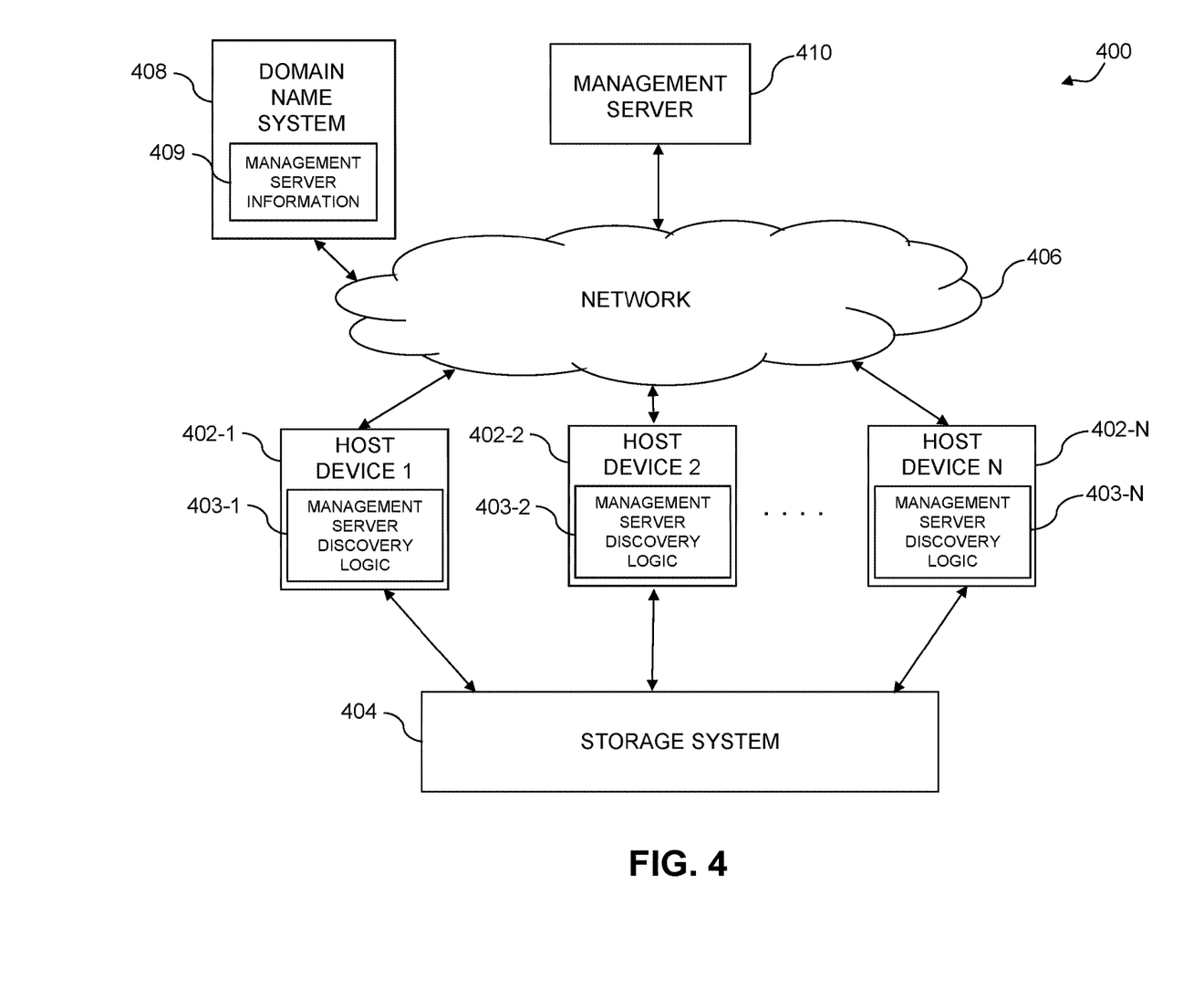
FIG. 4 depicts an information processing system with out-of-band discovery of a management server according to an illustrative embodiment.

Turning now to FIG. 4, an information processing system 400 configured with out-of-band discovery of a management server is depicted according to an illustrative embodiment. As shown, the information processing system 400 comprises a plurality of host devices 402-1, 402-2, . . . 402-N collectively referred to herein as host devices 402. The host devices 402 communicate with a storage system 404 via a network (not expressly shown but that in some embodiments is the same as or similar to network 203 described above in the context of the FIG. 2 embodiment). In some embodiments, the storage system 404 may comprise one or more storage arrays coupled to the host devices 402 via, or as part of, at least one storage area network (SAN). In some embodiments, storage system 404 is used by host devices 402 to read/write data as the host devices execute one or more applications (e.g., normal operational application-based functions of MPIO driver software).

As further shown, the host devices 402 are also coupled through a network 406 to a management server 410. Management server 410 is configured to provide the management operation support that the host devices 402 need to perform a specific management operation, e.g., licensing operations, as will be further explained below. Still further as shown, the host devices 402 are coupled through network 406 to a domain name system (DNS) 408 with management server information 409 stored thereon, as will be further explained below.

Network 406 may be implemented as a portion of a global computer network such as the Internet, although other types of networks can be part of the network 406, including a wide area network (WAN), a local area network (LAN), a satellite network, a telephone or cable network, a cellular network, a wireless network such as a WiFi or WiMAX network, or various portions or combinations of these and other types of networks. The network 406 in some embodiments therefore comprises combinations of multiple different types of networks each comprising processing devices configured to communicate using IP addresses and/or other types of communication protocols.

As also shown in FIG. 4, the host devices 402 respectively comprise management server discovery logic 403-1, 403-2, . . . 403-N individually referred to as management server discovery logic 403. Upon installation or update of a software program configured to execute on one of the host devices 402, the management server discovery logic 403 of the given host device 402 sends a query to DNS 408. As mentioned, DNS 408 includes management server information 409 previously stored thereon. In response to the query from the management server discovery logic 403 of the given host device 402, the DNS 408 sends a reply with the management server information 409 to the management server discovery logic 403 of the given host device 402.

The management server discovery logic 403 of the given host device 402 utilizes the management server information 409 obtained from the DNS 408 to contact the management server 410 via network 406 to perform a management operation, e.g., a licensing operation to enable one or more functionalities in the software program installed or updated on the given host device 402. For example, in some embodiments, the management server information 409 may comprise an IP address, a hostname, or some other suitable information for communicating with the management server 410.

In some embodiments, the management server information 409 is provided to the DNS 408 by a first one of the host devices 402 performing the management operation with the management server 410. The first one of the host devices 402 may obtain the management server information 409, e.g., through a data center administrator or some other initial bootstrapping mechanism. In alternative embodiments, the DNS 408 can be updated with the management server information 409 from the administrator or some other source. Thus, once the management server information 409 is stored on the DNS 408, host devices 402 (i.e., their corresponding management server discovery logic 403) each respectively send a request and obtain the management server information 409 from the DNS 408 and can then contact the management server 410 and perform the management operation.

Note that information processing system 400 illustrates an out-of-band (i.e., communication of management server information and normal host operational data over separate communication channels or networks) discovery of management server 410 since communication with DNS 408 is over one network (406) while normal host operations are conducted over another network coupling host devices 402 and storage system 404.

Figure 5:
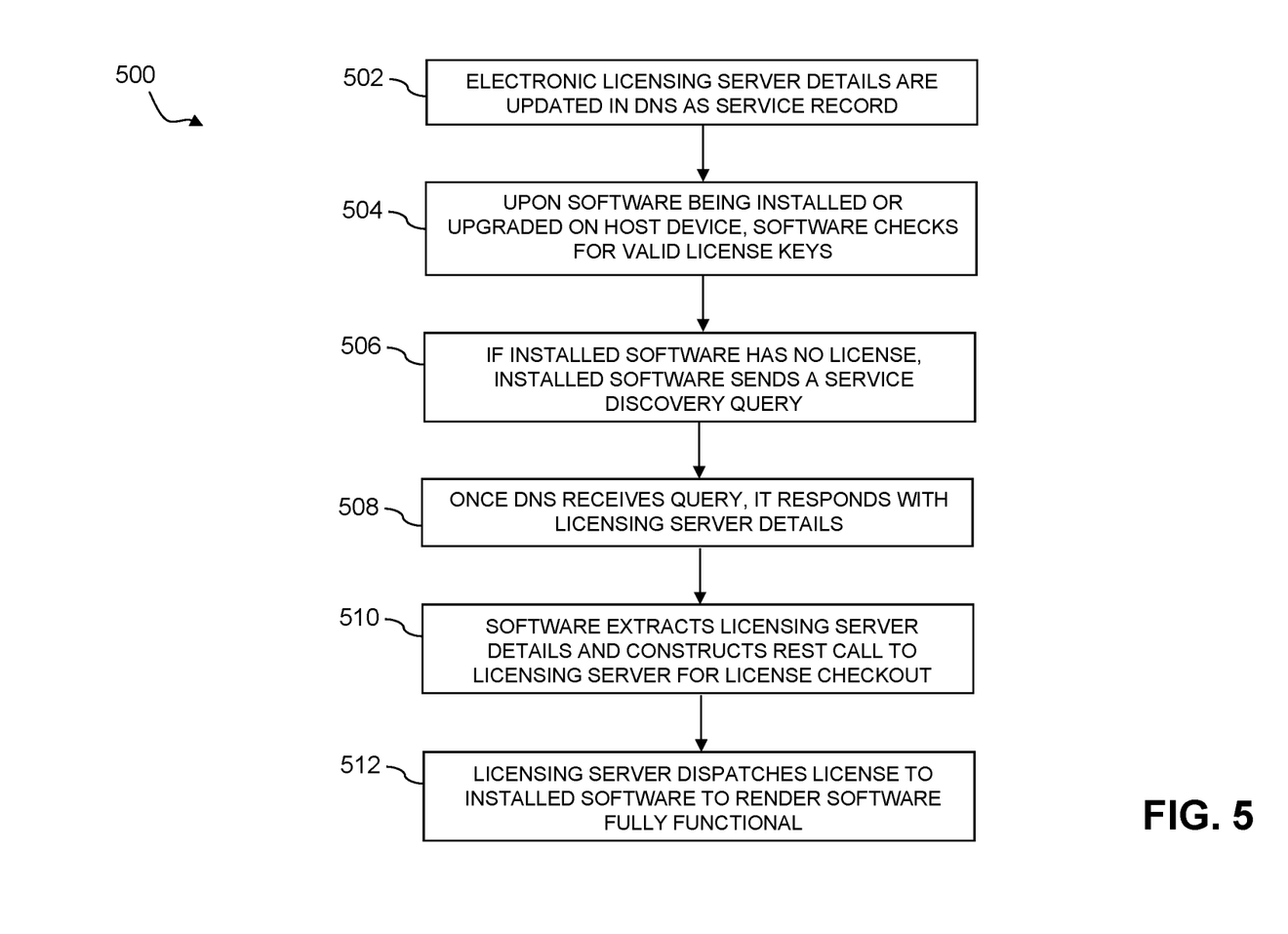
FIG. 5 depicts a methodology for out-of-band discovery of a management server according to an illustrative embodiment.

Referring now to FIG. 5, a methodology 500 is depicted for out-of-band discovery of a licensing server according to an illustrative embodiment.

In an out-of-band discovery and licensing embodiment, technologies such as Domain Name System-based Service Discovery (DNS-SD), multicast DNS (mDNS) or the like, can be used for licensing server discovery. Licensing server details (management server information 409) are updated once in any of the servers which provide services such as DNS-SD, mDNS, etc., when host-installed software (e.g., MPIO driver) checks for an available licensing server in the network. These discovery protocols provide an IP address or fully qualified domain name (FQDN) for reaching a licensing server, and then a request is made directly to the licensing server by the software for a valid electronic license.

An illustrative out-of-band discovery workflow is depicted in methodology 500 as follows:

Step 502: Electronic licensing server details (e.g., IP address of licensing server) are updated in a DNS as a service record.

Step 504: Upon software being installed or upgraded on a host device, the software checks for one or more valid license keys.

Step 506: If the installed software has no license, the installed software sends a service discovery query to the DNS using a protocol such as mDNS, DNS-SD, etc.

Step 508: Once the DNS receives this query, it responds with licensing server details.

Step 510: The software extracts the licensing server details and constructs a REST call with the host UUID to the licensing server, requesting license checkout.

Step 512: The licensing server, in response, dispatches a license (management object) to the software which then becomes fully functional.

Some advantages of the out-of-band methodology include but are not limited to:

1. With this implementation, once the discovery service is configured in an enterprise's root DNS, a host device dynamically discovers the licensing server and requests license checkout for any number of host devices in the data center.
2. Since these are standard protocols, implementation is feasible in any data center or information processing system.
3. Even if the licensing server's IP or hostname is changed, as soon as the discovery service is updated with new licensing server details, all host devices are able to refresh their license immediately without any configuration change in the respective host.
4. A similar approach can be used for any products which involve electronic licensing from remote servers.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, control logic and additional or alternative components. Moreover, the various assumptions made above in the course of describing the illustrative embodiments should also be viewed as exemplary rather than as requirements or limitations.

What is claimed is:

1. An apparatus comprising:
   a host device comprising a processor coupled to a memory;
   the host device being configured to:
   upon one of installation and update of a software program configured to execute on the host device and wherein a management operation is to be performed for the software program in conjunction with a management server, send a query to a given system with which the host device interacts with respect to one or more operations different than the management operation;
   obtain from the given system, in response to the query, a reply with management server information previously stored on the given system; and
   utilize the management server information obtained from the given system to communicate with the management server to perform the management operation;
   wherein the given system is independent of the management server;
   wherein the given system comprises a storage system operatively coupled to the host device, and further wherein the storage system is configured to store data associated with execution of the software program; and
   wherein the management operation comprises enabling a license for the software program.

2. The apparatus of claim 1, wherein the host device is further configured to generate the query, via the software program, prior to sending the query to the storage system.

3. The apparatus of claim 2, wherein the generated query comprises a command from an access protocol that the software program uses to access the storage system.

4. The apparatus of claim 3, wherein the access protocol is a Small Computer System Interface-based access protocol.

5. The apparatus of claim 1, wherein the host device is further configured to generate a call, via the software program, with a unique identifier of the host device to the management server, wherein the call comprises a request to perform the management operation.

6. The apparatus of claim 5, wherein the host device is further configured to receive, via the software program, a management object dispatched by the management server in response to the call and wherein the management object is configured to enable one or more functionalities in the software program.

7. The apparatus of claim 1, wherein the given system comprises a domain name system operatively coupled to the host device and wherein the host device is further configured to generate the query, via the software program, prior to sending the query to the domain name system.

8. The apparatus according to claim 1, wherein the host device is in communication with a network server through a first network protocol and wherein the host device is in communication with the given system through a second network protocol different from the first network protocol.

9. The apparatus of claim 1, wherein the management server information comprises at least one of a licensing server location address of the management server and a hostname of the management server.

10. A method performed by a host device, comprising:
    upon one of installation and update of a software program configured to execute on the host device and wherein a management operation is to be performed for the software program in conjunction with a management server, sending a query to a given system with which the host device interacts with respect to one or more operations different than the management operation;
    obtaining from the given system, in response to the query, a reply with management server information previously stored on the given system; and
    utilizing the management server information obtained from the given system to communicate with the management server to perform the management operation;
    wherein the given system is independent of the management server;
    wherein the given system comprises a storage system operatively coupled to the host device, and further wherein the storage system is configured to store data associated with execution of the software program;
    wherein the management operation comprises enabling a license for the software program; and
    wherein the host device comprises a processor coupled to a memory.

11. The method of claim 10, further comprising the host device generating the query, via the software program, prior to sending the query to the storage system.

12. The method of claim 11, wherein the generated query comprises a command from an access protocol that the software program uses to access the storage system.

13. The method of claim 12, wherein the access protocol is a Small Computer System Interface-based access protocol.

14. The method of claim 10, further comprising the host device generating a call, via the software program, with a unique identifier of the host device to the management server, wherein the call comprises a request to perform the management operation.

15. The method of claim 14, further comprising the host device receiving, via the software program, a management object dispatched by the management server in response to the call.

16. The method of claim 10, wherein the given system comprises a domain name system operatively coupled to the host device and wherein the host device is further configured to generate the query, via the software program, prior to sending the query to the domain name system.

17. The method of claim 10, wherein the management server information comprises at least one of a licensing server location address of the management server and a hostname of the management server.

18. A computer program product comprising a non-transitory processor-readable storage medium having stored therein program code of one or more software programs, wherein the program code, when executed by a host device comprising a processor coupled to a memory, causes the host device to:
    upon one of installation and update of a software program configured to execute on the host device and wherein a management operation is to be performed for the software program in conjunction with a management server, send a query to a given system with which the host device interacts with respect to one or more operations different than the management operation;

obtain from the given system, in response to the query, a reply with management server information previously stored on the given system; and utilize the management server information obtained from the given system to communicate with the management server to perform the management operation;

wherein the given system is independent of the management server;

wherein the given system comprises a storage system operatively coupled to the host device, and further wherein the storage system is configured to store data associated with execution of the software program; and wherein the management operation comprises enabling a license for the software program.

19. The computer program product of claim 18, wherein the given system further comprises:

a domain name system operatively coupled to the host device.

20. The computer program product of claim 18, wherein the management server information comprises at least one of a licensing server location address of the management server and a hostname of the management server.

* * * * *